(12) United States Patent
Berretta et al.

(10) Patent No.: US 10,069,148 B2
(45) Date of Patent: Sep. 4, 2018

(54) FUEL CELL WITH SELECTIVELY CONDUCTING ANODE

(71) Applicants: Daimler AG, Stuttgart (DE); Ford Motor Company, Dearborn, MI (US)

(72) Inventors: Francine Berretta, Vancouver (CA); Stephen Lee, Burnaby (CA); Joy Roberts, Coquitlam (CA); Stanley Tam, Richmond (CA); Herwig Haas, New Westminster (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 196 days.

(21) Appl. No.: 14/697,770

(22) Filed: Apr. 28, 2015

(65) Prior Publication Data

US 2015/0325859 A1    Nov. 12, 2015

Related U.S. Application Data

(60) Provisional application No. 61/991,512, filed on May 10, 2014.

(51) Int. Cl.
| | |
|---|---|
| *H01M 8/0206* | (2016.01) |
| *H01M 4/86* | (2006.01) |
| *H01M 8/1018* | (2016.01) |
| *H01M 4/88* | (2006.01) |
| *H01M 8/24* | (2016.01) |

(Continued)

(52) U.S. Cl.
CPC ....... *H01M 8/0206* (2013.01); *H01M 4/8657* (2013.01); *H01M 4/8663* (2013.01); *H01M 4/8892* (2013.01); *H01M 8/0226* (2013.01); *H01M 8/0232* (2013.01); *H01M 8/0234* (2013.01); *H01M 8/0243* (2013.01); *H01M 8/04225* (2016.02); *H01M 8/04228* (2016.02); *H01M 8/1007* (2016.02); *H01M 8/1018* (2013.01); *H01M 8/2405* (2013.01); *H01M 8/2465* (2013.01); *H01M 2004/8684* (2013.01); *H01M 2008/1095* (2013.01); *H01M 2250/20* (2013.01); *Y02E 60/521* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 5,013,617 | A | 5/1991 | Scheffler |
| 5,045,414 | A | 9/1991 | Bushnell et al. |

(Continued)

FOREIGN PATENT DOCUMENTS

WO    2011076396 A1    6/2011

*Primary Examiner* — Wojciech Haske
(74) *Attorney, Agent, or Firm* — Stephan A. Pendorf; Patent Central LLC

(57) ABSTRACT

Use of a selectively conducting anode component in solid polymer electrolyte fuel cells can reduce the degradation associated with repeated startup and shutdown, but can also adversely affect a cell's tolerance to voltage reversal along with its performance. It was shown that these adverse affects can be mitigated against in certain ways. However, improved results can be obtained by employing a selectively conducting component which comprises a mixed layer of a selectively conducting material and carbon. The mixed layer contacts the side of the anode opposite the solid polymer electrolyte.

16 Claims, 7 Drawing Sheets

(51) Int. Cl.
- *H01M 8/04228* (2016.01)
- *H01M 8/04225* (2016.01)
- *H01M 8/2465* (2016.01)
- *H01M 8/0226* (2016.01)
- *H01M 8/0232* (2016.01)
- *H01M 8/0234* (2016.01)
- *H01M 8/0243* (2016.01)
- *H01M 8/1007* (2016.01)

(56) References Cited

U.S. PATENT DOCUMENTS

| | | |
|---|---|---|
| 6,858,336 B2 | 2/2005 | Reiser et al. |
| 6,887,599 B2 | 5/2005 | Reiser et al. |
| 2004/0121122 A1* | 6/2004 | Reynolds, III ...... H01M 8/0234 428/137 |
| 2009/0075155 A1* | 3/2009 | Reshetenko ........ H01M 4/8605 429/481 |
| 2012/0328967 A1* | 12/2012 | Haas ................. H01M 8/04955 429/429 |
| 2014/0030625 A1 | 1/2014 | Haas et al. |

\* cited by examiner

FUEL CELL WITH SELECTIVELY CONDUCTING ANODE

BACKGROUND

Field of the Invention

The present invention pertains to solid polymer electrolyte fuel cells comprising selectively conducting anodes which improve durability, and to methods and constructions for obtaining desirable performance and tolerance to voltage reversal.

Description of the Related Art

Sustained research and development effort continues on fuel cells because of the energy efficiency and environmental benefits they can potentially provide. Solid polymer electrolyte fuel cells are particularly suitable for consideration as power supplies in traction applications, e.g. automotive. However, improving the durability of such cells to repeated exposure to startup and shutdown remains a challenge for automotive applications in particular.

Unacceptably high degradation rates in performance can occur in solid polymer electrolyte fuel cells subjected to repeated startup and shutdown cycles. The degradation can be further exacerbated when using low catalyst loadings in the electrodes for cost saving purposes. Often, there is a trade-off between durability and cost in the fuel cell. During the startup and shut-down of fuel cell systems, corrosion enhancing events can occur. In particular, air can be present at the anode at such times (either deliberately or as a result of leakage) and the transition between air and fuel in the anode is known to cause temporary high potentials at the cathode, thereby resulting in carbon corrosion and platinum catalyst dissolution. Such temporary high cathode potentials can lead to significant performance degradation over time. It has been observed that the lower the catalyst loading, the faster the performance degradation. The industry therefore needs to find means to address the performance degradation.

A number of approaches for solving the degradation problem arising during startup and shutdown have been suggested in the art. For example, the problem has been addressed by employing higher catalyst loadings, valves around the stack to prevent air ingress into the anode during storage, and using carefully engineered shutdown strategies. Some suggested systems incorporate an inert nitrogen purge and nitrogen/oxygen purges to avoid damaging gas combinations being present during these transitions. See for example U.S. Pat. No. 5,013,617 and U.S. Pat. No. 5,045,414.

Some other concepts involve fuel cell stack startup strategies involving fast flows to minimize potential spikes. For example, U.S. Pat. No. 6,858,336 and U.S. Pat. No. 6,887,599 disclose disconnecting a fuel cell system from its primary load and rapidly purging the anode with air on shutdown and with hydrogen gas on startup respectively in order to reduce the degradation that can otherwise occur. While this can eliminate the need to purge with an inert gas, the methods disclosed still involve additional steps in shutdown and startup that could potentially cause complications. Shutdown and startup can thus require additional time and extra hardware is needed in order to conduct these procedures.

Recently, in PCT patent application serial number WO2011/076396 by the same applicant, which is hereby incorporated by reference in its entirety, it was disclosed that the degradation of a solid polymer fuel cell during startup and shutdown can be reduced by incorporating a suitable selectively conducting component in electrical series with the anode components in the fuel cell. The component is characterized by a low electrical resistance in the presence of hydrogen or fuel and a high resistance in the presence of air (e.g. more than 100 times lower in the presence of hydrogen than in the presence of air).

It was noted in WO2011/076396 however that the presence of a selectively conducting component or layer could potentially lead to a loss in cell performance (due to an increase in internal resistance) and also could lower the tolerance of the fuel cell to voltage reversals. Still, judicious choices of components (e.g. such as those illustrated in the Examples) can be effective for improving durability with only a minimal, acceptable effect on performance. And a remedy for a lowering in voltage reversal tolerance was suggested. Instead of extending the layer of selectively conducting material over the entire active surface of the anode, some regions could be provided where the layer was absent to allow for dissipation of reversal currents and/or provide a sacrificial area in the event of cell reversal. Further, it was mentioned that it may be advantageous to keep the selectively conducting layer separate from the anode catalyst. A carbon sublayer may for instance be incorporated between the two for this purpose. While this can also provide a potential solution for voltage reversal tolerance, it can adversely affect performance.

It was thus found to be difficult to simultaneously achieve commercially preferred voltage reversal tolerance and commercially preferred performance as well as startup/shutdown durability. In later patent application US2014/0030625 however, an improved approach was disclosed to address the problem of lower voltage reversal tolerance when using a selectively conducting anode component in such cells. Fuel cells exhibiting acceptable behaviour in every regard could be obtained by incorporating a carbon sublayer in contact with the side of the anode opposite the solid polymer electrolyte, and appropriately selecting the selectively conducting material and carbon sublayer such that the fuel cell voltage is greater than about 0.5 V when operating at 1.5 A/cm$^2$. However, while acceptable, cells incorporating such sublayers did not perform quite as well as cells without such sublayers.

There thus remains a desire for improvement in fuel cells comprising selectively conducting anodes, and specifically for improvement in performance and tolerance to voltage reversal. The present invention fulfills this and other needs.

SUMMARY

Use of a selectively conducting component in the anode of a solid polymer electrolyte fuel cell desirably improves startup/shutdown durability. But it has been found to be difficult to simultaneously achieve commercially acceptable voltage reversal tolerance and commercially acceptable performance as well as startup/shutdown durability in this way. The present invention addresses these problems by incorporating a mixed layer comprising a mixture of a selectively conducting material and carbon in between the anode and anode gas diffusion layer of the cell. Surprisingly, this approach can provide for desirable voltage reversal tolerance and improved cell performance.

Specifically, the improved solid polymer electrolyte fuel cell comprises a solid polymer electrolyte, a cathode, and anode components connected in series electrically wherein the anode components comprise an anode, an anode gas diffusion layer, and a selectively conducting component. The selectively conducting component either is the aforementioned mixed layer or comprises the mixed layer in its structure. The mixed layer in the selectively conducting component comprises a mixture of a selectively conducting material and carbon and is located in contact with the side of the anode opposite the solid polymer electrolyte. As in WO2011/076396, the electrical resistance of the selectively conducting component in the presence of hydrogen is more than 100 times lower, and preferably more than 1000 times lower than the electrical resistance in the presence of air.

An appropriate selectively conducting material comprises a noble metal, such as platinum, deposited on a metal oxide, such as tin oxide. An exemplary selectively conducting material comprises $SnO_2$. An appropriate carbon for the mixed layer is a synthetic graphite.

In exemplary fuel cells, the mixed layer can comprise from about 6% to about 14% carbon by weight.

The thickness of the mixed layer can be in the range from about 6 to about 12 micrometers.

The selectively conducting component can consist solely of the mixed layer, or alternatively it can comprise the mixed layer and a separate selectively conducting layer. In such a bilayer embodiment, the separate selectively conducting layer is located in contact with the side of the mixed layer opposite the solid polymer electrolyte. The selectively conducting layer can consist essentially of the selectively conducting material and binder.

In exemplary fuel cells using such bilayer embodiments, the mixed layer can comprise from about 13% to about 50% carbon by weight. The thickness of the mixed layer can be in the range from about 2 to about 4 micrometers. And the thickness of the selectively conducting layer can be in the range from about 2 to about 8 micrometers.

As in the aforementioned US2014/0030625, it can be desirable to choose the selectively conducting material, carbon, and mixed layer characteristics such that the fuel cell voltage is greater than about 0.5 V when operating at 1.5 $A/cm^2$.

Being directed in part to voltage reversal tolerance, the invention is particularly intended for fuel cell stacks and particularly for those in fuel cell systems which will be subjected to numerous startup and shutdown sequences over the lifetime of the system (e.g. over 1000) because the accumulated effects of degradation will be much more substantial. For instance, the invention is particularly suitable for automotive applications in which the fuel cell system is the traction power supply for the vehicle.

DETAILED DESCRIPTION

Herein, in a quantitative context, the term "about" should be construed as being in the range up to plus 10% and down to minus 10%.

An improved solid polymer electrolyte fuel cell of the invention comprises a selectively conducting anode component comprising a mixed layer of a selectively conducting material and electrically conductive carbon in contact with the side of the anode opposite the solid polymer electrolyte. The selectively conducting anode component provides for improved durability on startup and shutdown. The use of the mixed layer mitigates against associated losses in voltage reversal tolerance and cell performance (i.e. output voltage versus current density capability).

Figure 1:
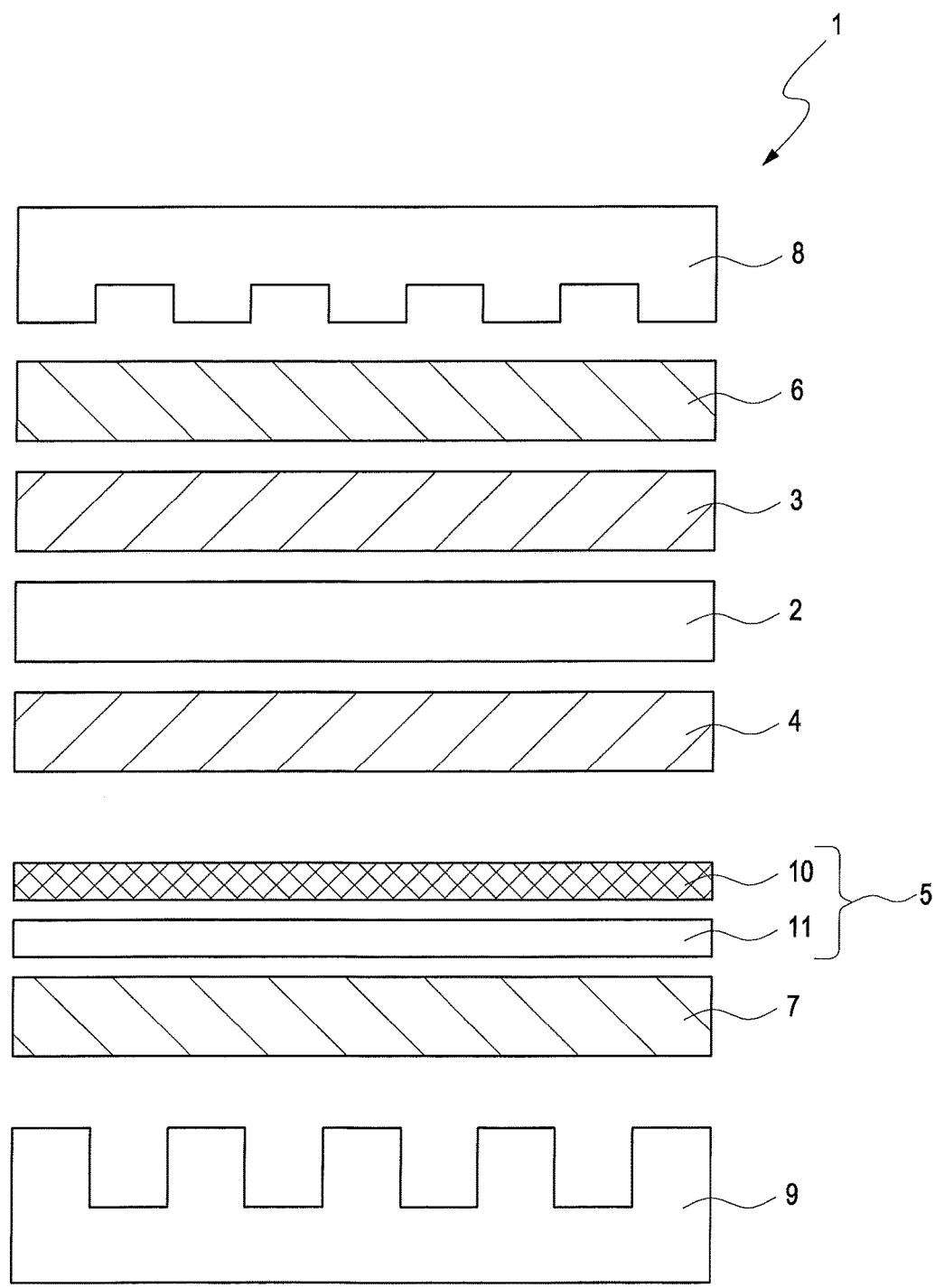
FIG. 1 shows an exploded schematic view of the various components making up a unit solid polymer electrolyte fuel cell for a fuel cell stack.

Except for the selectively conducting anode component, the construction of the fuel cell, and stacks thereof, can be any of the conventional constructions known to those in the art. FIG. 1 shows an exploded schematic view of the various components making up a unit solid polymer electrolyte fuel cell for use in a fuel cell stack. Unit cell 1 comprises a solid polymer electrolyte 2, cathode 3, and anode 4. Adjacent the cathode electrode is cathode gas diffusion layer (GDL) 6. Anode GDL 7 is associated with anode electrode 4 (but separated therefrom by selectively conducting component 5). Adjacent these two GDLs are cathode flow field plate 8 and anode flow field plate 9 respectively. Selectively conducting component 5 is incorporated in electrical series with the other anode components.

As shown in FIG. 1, selectively conducting component 5 comprises mixed layer 10 located on the side of anode 4 opposite solid polymer electrolyte 2. Selectively conducting component 5 can also optionally comprise an additionally selectively conducting layer 11 on the side of mixed layer 10 opposite solid polymer electrolyte 2.

As per the teachings in WO2011/076396, selectively conducting component 5 is engineered overall such that its electrical resistance in the presence of hydrogen is more than 100 times lower, and preferably more than 1000 times lower than the electrical resistance in the presence of air. This provides for desired durability on repeated startup and shutdown cycles.

Noble metal deposited on a metal oxide is suitable for use as the selectively conducting material used in selectively conducting component 5, mixed layer 10, and optional selectively conducting layer 11. For instance, platinum deposited on tin oxide is suitable. And in particular, as illustrated in the Examples below, the selectively conducting material can be $SnO_2$.

Mixed layer 10 comprises a carbon as well as selectively conducting material. A variety of carbon powders may be suitable for use. For example, synthetic graphite is suitable. Mixed layer 10 can also comprise binder as is typically used in the art. During manufacture, pore forming materials may also be employed in mixed layer 10 (also as known in the art).

The structure of mixed layer 10 is selected to provide improved voltage reversal tolerance and performance of the fuel cell. As will be appreciated by those skilled in the art, the most appropriate types and amounts of materials used in mixed layer 10, along with its thickness and porosity, will vary depending on other characteristics of the cell construction. However, guidance for such appropriate engineering choices can be obtained from the Examples below. Those skilled in the art can be expected to make appropriate modifications according to differing specifics of cell construction. For instance, appropriate amounts of carbon in mixed layer 10 can range from about 6% to about 14% carbon by weight. And appropriate thicknesses for the mixed layer can range from about 6 to about 12 micrometers. Qualitatively, it can be expected that greater ratios of carbon will improve performance and voltage reversal tolerance, while detracting from durability. In a like manner, it can be expected that thinner selectively conducting components will improve performance and voltage reversal tolerance, while detracting from durability. Thus, as will be appreciated, modifications may be required to obtain the most appropriate balance between these characteristics.

As illustrated in the Examples below, use of optional selectively conducting layer 11 in combination with mixed layer 10 (a "bilayer" construction) can provide superior improvement in certain embodiments. Optional selectively conducting layer 11 preferably consists essentially of selectively conducting material and a binder, and does not contain carbon powder. Again however, during manufacture, pore forming materials may also be employed therein.

As with mixed layer 10 above, the most appropriate types and amounts of materials used in optional selectively conducting layer 11, along with those of the mixed layer 10 to be used in combination therewith, and along with their respective thicknesses and porosities, will vary depending on other characteristics of the cell construction. And again, guidance for engineering choices here can be obtained from the Examples below. For instance, in such a bilayer embodiment, appropriate amounts of carbon in associated mixed layer 10 can now range from about 13% to about 50% carbon by weight. And appropriate thicknesses for an associated mixed layer 10 can range from about 2 to about 4 micrometers. And in such a bilayer embodiment, the thickness of selectively conducting layer 11 can be in the range from about 2 to about 8 micrometers. For improved cell performance, these various selections are made such that the fuel cell voltage is greater than about 0.5 V when operating at 1.5 A/cm$^2$.

Methods for incorporating noble metals on a metal oxide, methods for making appropriate dispersions for coating selectively conducting layers and for performing the coating, and other engineering considerations are discussed in detail in WO2011/076396 and may be considered for use here. Various other methods for preparing and incorporating layers, like mixed layer 10 and optional selectively conducting layer 11, are also known in the art and can be employed here.

Using a selectively conducting component in the fuel cell anode provides the advantage of improved startup/shutdown durability. And incorporating this mixed layer in accordance with the invention additionally provides superior advantages with regards to voltage reversal tolerance and cell performance. Further still, the thickness of the membrane electrode assembly can be decreased compared to the approach of incorporating a carbon layer as per the aforementioned US2014/0030625.

The following Examples have been included to illustrate certain aspects of the invention but should not be construed as limiting in any way.

EXAMPLES

Various experimental fuel cells and stacks were prepared and subjected to startup/shutdown cycle testing, voltage reversal tolerance testing, and performance testing to compare these characteristics. The series included comparative fuel cells (with and without selecting conducting layers included), as well as fuel cells comprising different variations of the invention (with mixed layers alone and with mixed layers combined with an optional selectively conducting layer).

The cells all comprised catalyst coated membrane electrolytes (CCMs) sandwiched between anode and cathode gas diffusion layers (GDLs) comprising commercial carbon fibre paper from Freudenberg. (In many cases, complete GDLs were obtained commercially from Freudenberg.) The CCMs all had membrane electrolytes made of perfluorosulfonic acid ionomer from 14 to 18 micrometer thick which had been coated on opposite sides with the desired anode and cathode catalyst layers. The catalyst used in the conventional carbon supported platinum (Pt/C) cathode and anode catalyst layers was a commercial product comprising about 46% Pt by weight. The coated catalyst layer in the cathodes and anodes comprised about 0.3 to 0.4 and about 0.1 mg/cm$^2$ of Pt respectively.

The selectively conducting layers and mixed layers used in the experimental cells comprised a proprietary $SnO_2$ composition obtained from a commercial supplier. The mixed layers also comprised varied amounts of synthetic graphite (KS4 from Timcal). As indicated, these layers were provided as coatings on the anode GDL and were applied using a solid-liquid ink dispersion comprising a mixture of the $SnO_2$, optional synthetic graphite, METHOCEL™ methylcellulose polymer, distilled water, and isopropyl alcohol. PTFE was included as a binder in the dispersions. The dispersions were then applied, dried, and sintered as described in the aforementioned PCT patent application WO2011/076396.

Assemblies comprising the appropriate CCMs, selectively conducting layers and/or mixed layers, and anode and cathode GDLs were then bonded together under elevated temperature and pressure and placed between appropriate cathode and anode flow field plates to complete the experimental fuel cell constructions.

Cells were then conditioned by operating at a current density of 1.5 A/cm$^2$, with hydrogen and air as the supplied reactants at 100% RH, and at a temperature of 60° C. for at least 16 hours.

Performance characteristics of single cells were determined by measuring output voltage as a function of current density applied otherwise under the same conditions as above. The current density was varied from 0 to over 2 A/cm$^2$ and voltage versus current density plots (polarization plots) were generated.

The voltage reversal testing involved operating single cells first at a lower current density of 1 A/cm$^2$ for 2 hours, then turning off the current, switching the reactant supply to the anode from hydrogen to nitrogen instead, and then forcing 0.2 A/cm$^2$ from the cell, thereby subjecting the cells to voltage reversal conditions. Typically, the cell voltage would roughly plateau at a value between 0 and about −3 volts for a variable amount of time and then drop off suddenly to a value much less than −5 V, at which point testing ended. The length of time to this sudden drop off point is representative of the cell's ability to tolerate voltage reversal and is denoted in the following as the reversal time.

For startup/shutdown testing, multi-cell stacks were operated at a current density of 1.5 A/cm$^2$ using hydrogen and air reactants at 60° C. and 70% RH and were periodically subjected to startup/shutdown cycles designed to accelerate degradation. The cycling comprised removing the electrical load while maintaining the flow of reactants for 10 seconds, applying a load for 5 seconds to draw 0.7 A/cm$^2$, ramping the load over 30 seconds to draw 1.5 A/cm$^2$, removing the load for 5 seconds while maintaining the flow of reactants, purging the anode with air for 15 seconds, and repeating. Average voltage output of each cell was recorded after each startup/shutdown cycle. In addition, polarization characteristics (voltage as a function of current density) characteristics were obtained for the stacks throughout the startup/shutdown cycle testing.

Table 1 provides a brief description of the selectively conducting anode components used in each single cell tested. The selectively conducting components in the inventive cells were arranged as shown in FIG. 1.

TABLE 1

| Cell # | Selectively conducting anode component |
|---|---|
| C | None; comparative cell |
| SC | Selectively conducting layer only; thickness 10 microns; comparative cell |
| M(6% C) | Mixed layer with 6% KS4 by weight; thickness 10 microns |
| M(8% C) | Mixed layer with 8% KS4 by weight; thickness 10 microns |
| M(9.5% C) | Mixed layer with 9.5% KS4 by weight; thickness 9 microns |
| M(11.3% C) | Mixed layer with 11.3% KS4 by weight; thickness 11 microns |
| M(13% C) | Mixed layer with 13% KS4 by weight; thickness 9 microns |
| B(50% C)7μ | Bilayer construction; mixed layer with 50% KS4 by weight, thickness 3 microns; & selectively conducting layer, thickness 7 microns |
| B(50% C)2μ | Bilayer construction; mixed layer with 50% KS4 by weight, thickness 3 microns; & selectively conducting layer, thickness 2 microns |

Table 2 provides a brief description of the selectively conducting anode components used in the stacks tested. Again, the selectively conducting components were arranged as shown in FIG. 1.

TABLE 2

| Stack # | Selectively conducting anode components |
|---|---|
| C1* | None; comparative cell stack |
| C2* | None; comparative cell stack |
| M*(6% C)7μ | Mixed layer with 6% KS4 by weight; thickness 7 microns |
| M*(6% C)11μ | Mixed layer with 6% KS4 by weight; thickness 11 microns |
| B*(50% C)2μ | Bilayer construction; mixed layer with 50% KS4 by weight, thickness 3 microns; & selectively conducting layer, thickness 2 microns |

Figure 2:
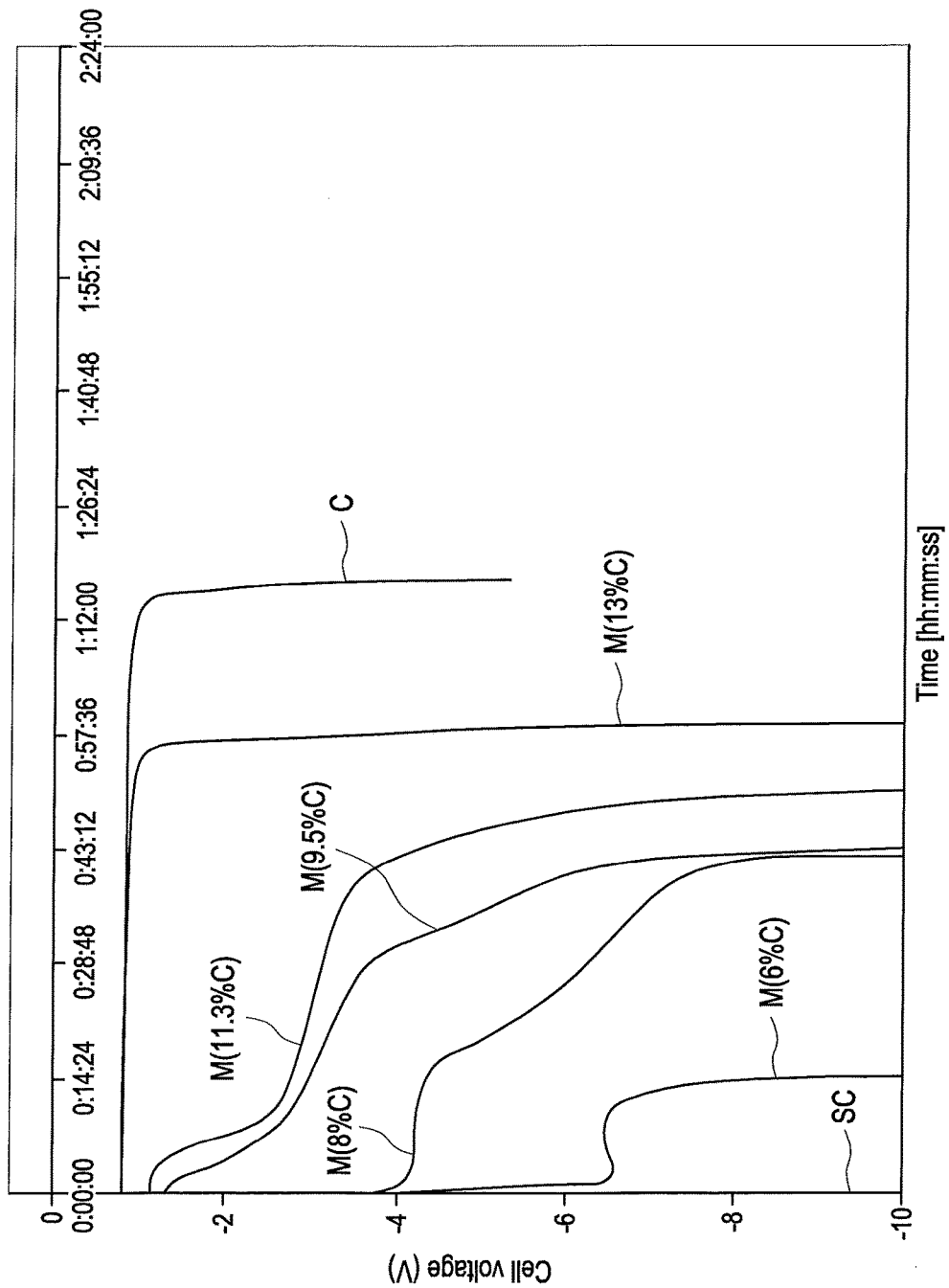
FIG. 2 compares plots of voltage versus time during voltage reversal testing for representative inventive cells comprising a mixed layer (of selectively conducting oxide and carbon) to plots for comparative cells from the Examples.

The experimental cells were then operated and tested as described above. FIG. 2 compares plots of voltage versus time during voltage reversal testing for the inventive cells comprising just a mixed layer (i.e. no optional selectively conducting layer present) to plots for comparative cells C and SC. Comparative cell C has no selectively conducting layer present at all and performs very well in reversal, with a reversal time of about 75 minutes. Comparative cell SC has a selectively conducting layer but no mixed layer nor carbon sublayer to improve voltage reversal tolerance. It performs very poorly and has a reversal time of less than a minute. The various inventive cells with mixed layers present perform increasingly well in reversal with increased amount of carbon present in the mixed layer.

Figure 3:
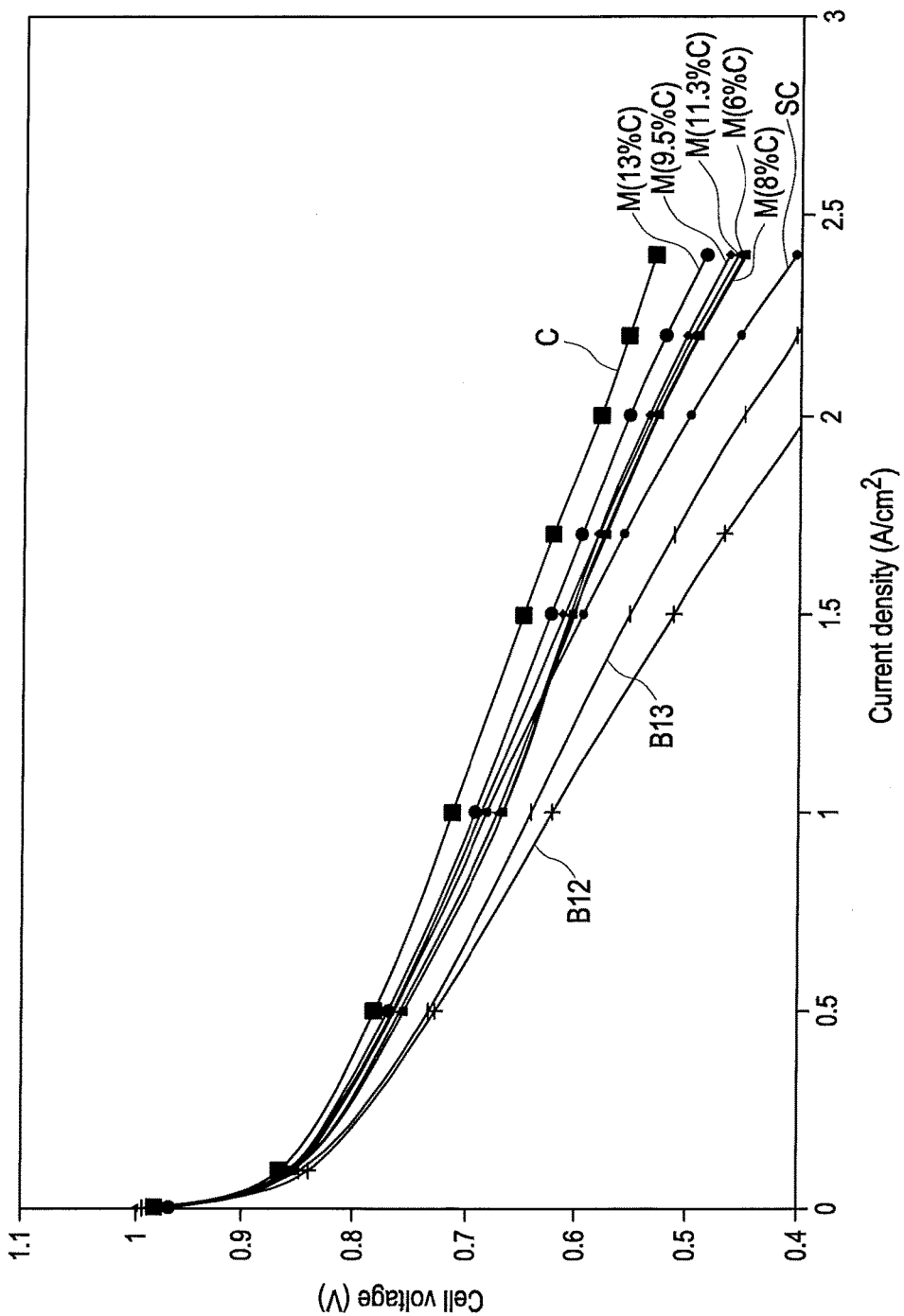
FIG. 3 compares polarization plots for representative inventive cells comprising a mixed layer to plots for comparative cells from the Examples.

FIG. 3 compares polarization plots for inventive cells comprising just a mixed layer to plots for comparative cell C and also for cells B12 and B13 which have been reproduced and added from the aforementioned US2014/0030625. As is evident in FIG. 3, the inventive cells show a modest loss in performance compared to cell C with no selectively conducting component. However, the inventive cells all perform significantly better than cells B12 and B13 which employed a carbon sublayer. Cells B12 and B13 were the best performing cells in the examples from US2014/0030625 that provided for improved voltage reversal tolerance.

Figure 4:
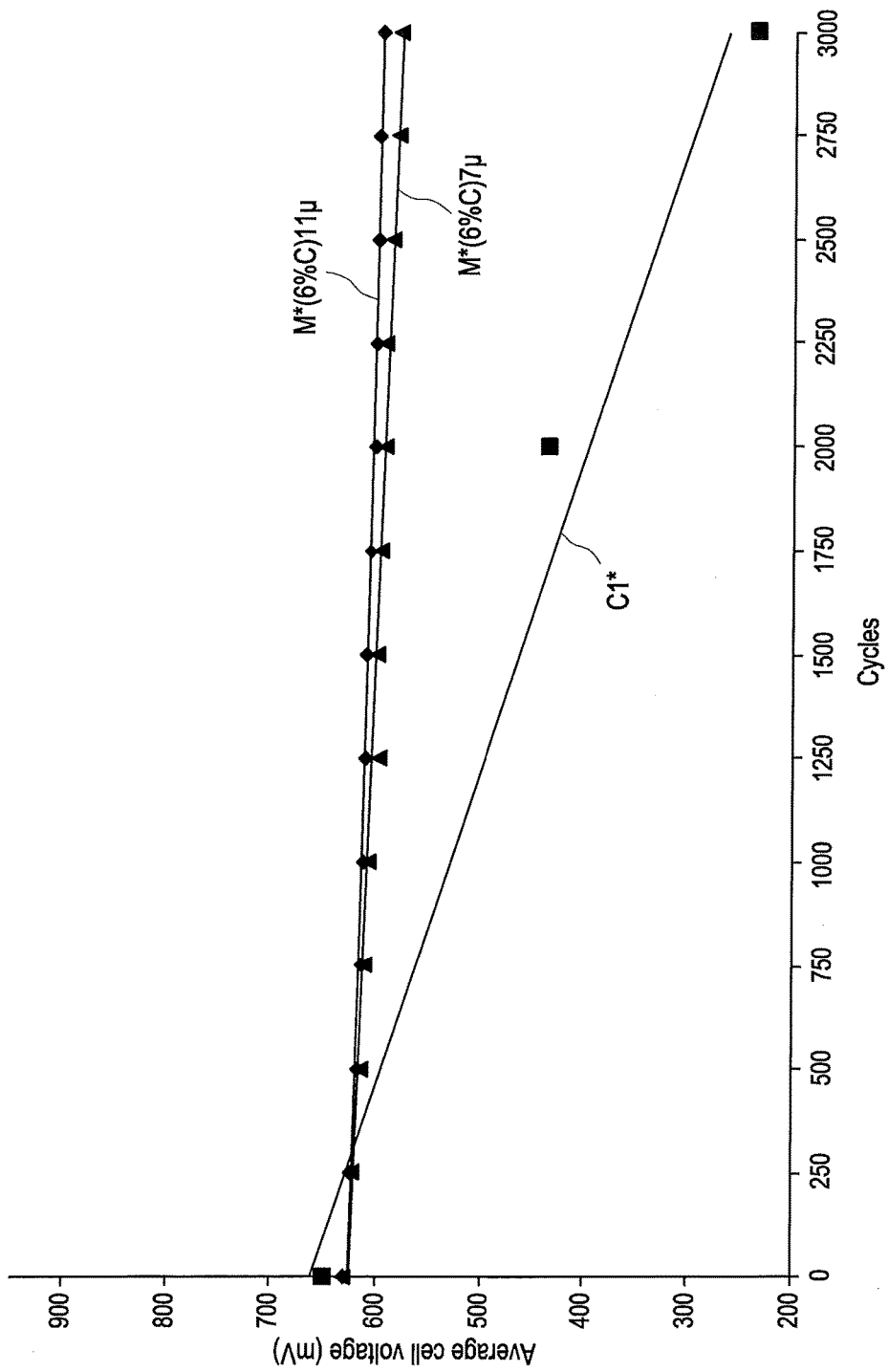
FIG. 4 compares plots of output voltage at 1.5 $A/cm^2$ versus number of startup/shutdown cycles for representative inventive stacks comprising a mixed layer to plots for a comparative conventional stack from the Examples.

FIG. 4 compares plots of average output voltage at 1.5 A/cm$^2$ versus number of startup/shutdown cycles for the inventive stacks comprising just a mixed layer to the plot for comparative conventional stack C1*. The performance of the inventive stacks is substantially better than that of the conventional stack.

Figure 5:
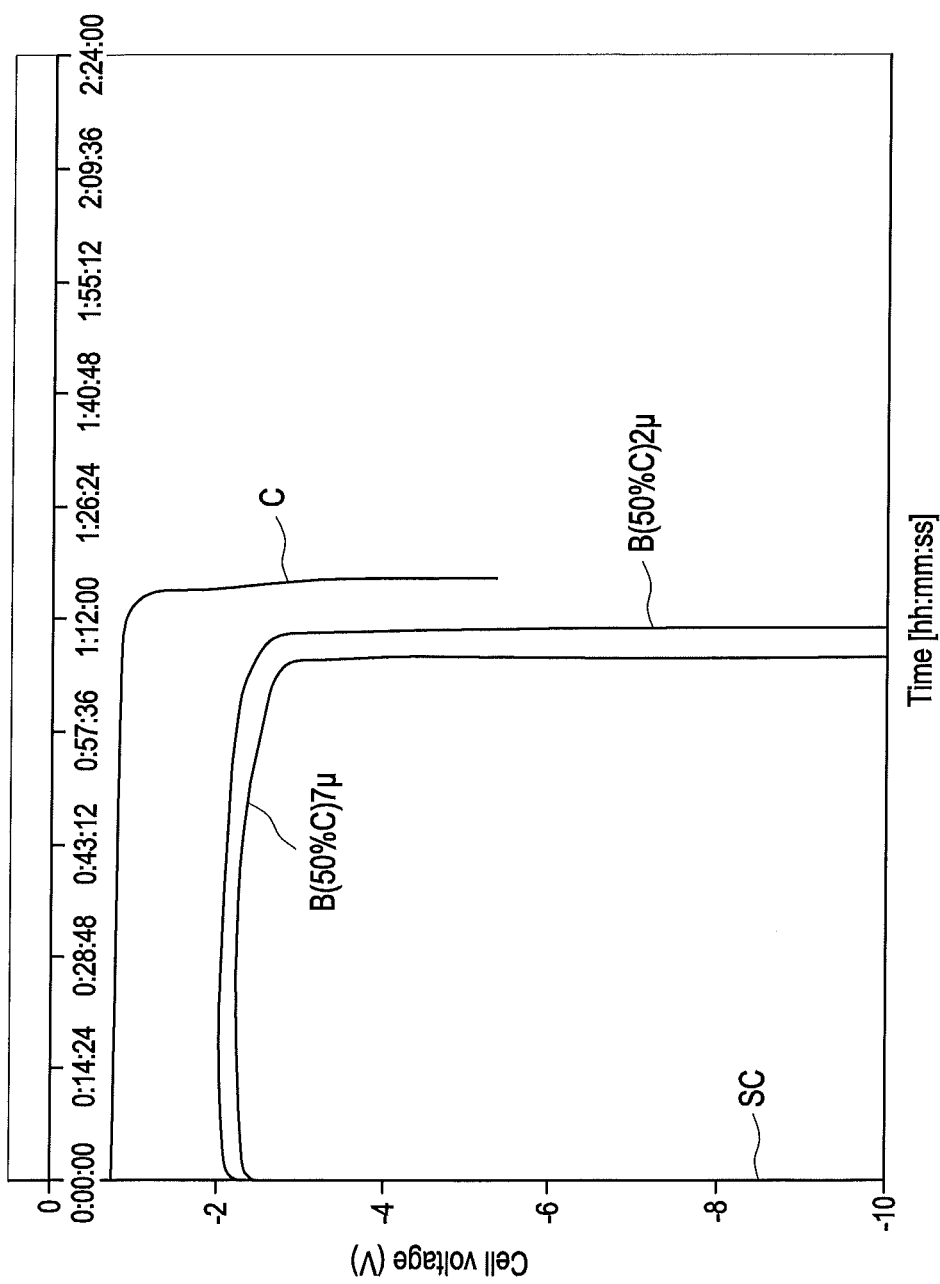
FIG. 5 compares plots of voltage versus time during voltage reversal testing for representative inventive cells comprising a bilayer (a mixed layer combined with a selectively conducting layer) to plots for comparative cells from the Examples.

FIG. 5 compares plots of voltage versus time during voltage reversal testing for the inventive cells comprising a bilayer (a mixed layer combined with a selectively conducting layer) to plots for comparative cells C and SC. As in FIG. 2, comparative cell C performed very well in reversal, while comparative cell SC performed very poorly. The inventive cells with bilayers performed well in this testing.

Figure 6:
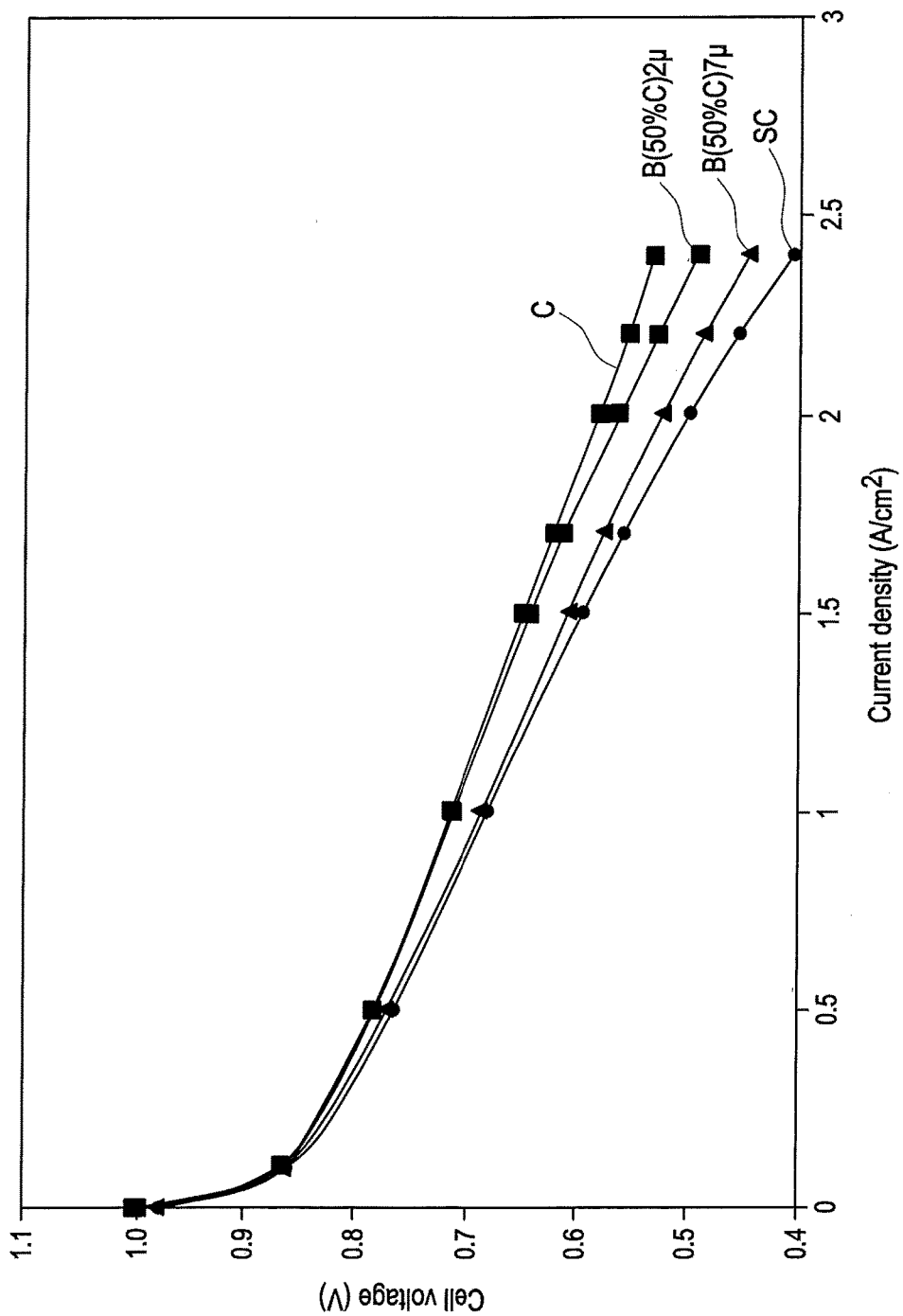
FIG. 6 compares polarization plots for representative inventive cells comprising a bilayer to plots for comparative cells from the Examples.

FIG. 6 compares polarization plots for the inventive cells comprising a bilayer to plots for comparative cells. Cell B(50% C)2μ with the thinner selectively conducting layer performed better than cell B(50% C)7μ with the thicker selectively conducting layer. The former cell showed the best polarization performance of all the inventive cells tested.

Figure 7:
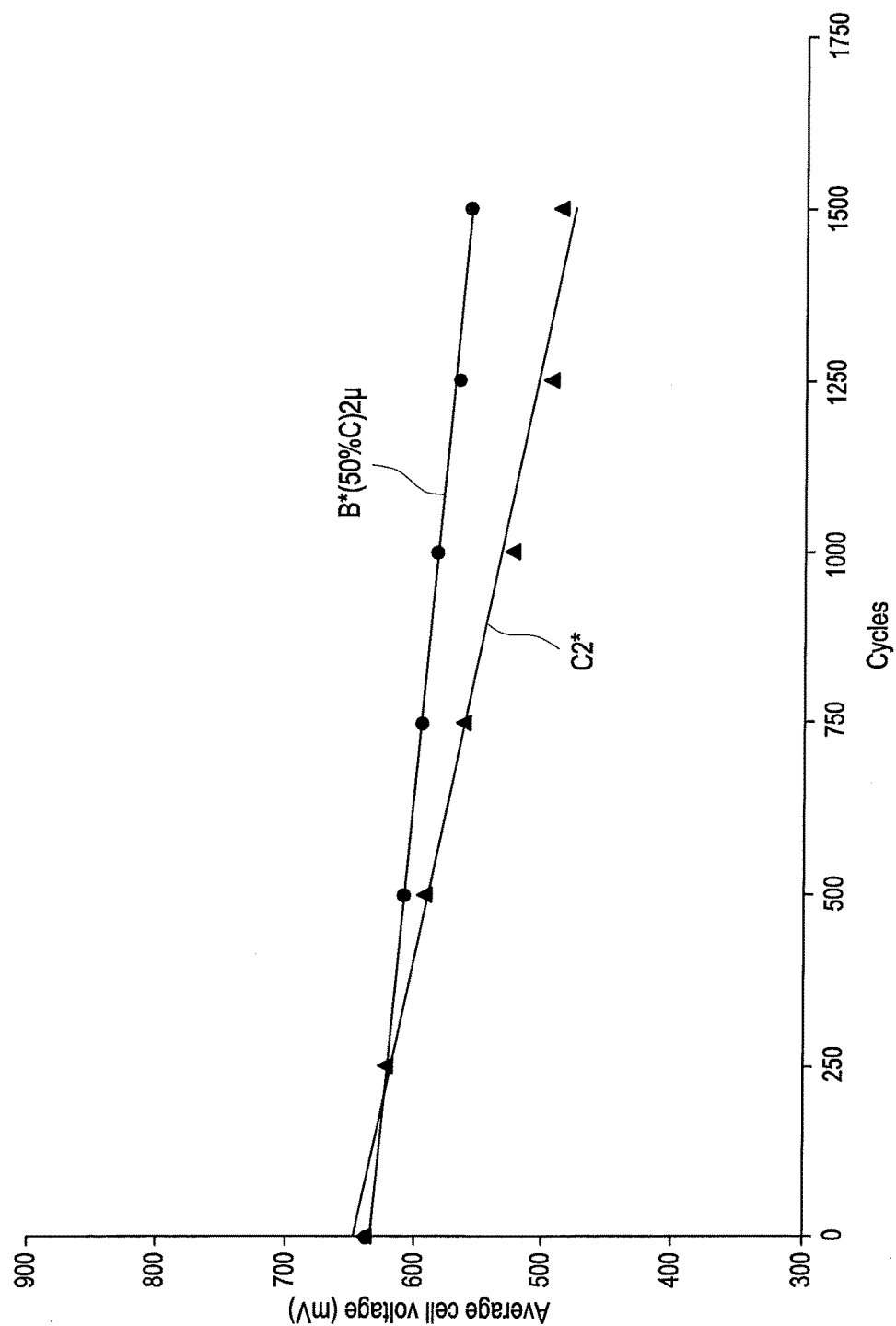
FIG. 7 compares plots of output voltage at 1.5 $A/cm^2$ versus number of startup/shutdown cycles for a representative inventive stack comprising a bilayer to a plot for a comparative conventional stack from the Examples.

FIG. 7 compares plots of average output voltage at 1.5 A/cm$^2$ versus number of startup/shutdown cycles for the inventive stack comprising a bilayer to a plot for comparative conventional stack C2*. The performance of the inventive stack is better than that of the conventional stack.

The preceding examples show that cells or stacks comprising a mixed layer of selectively conducting material and carbon have markedly improved performance while maintaining voltage reversal tolerance and startup/shutdown durability. Further, in certain embodiments, cells comprising a bilayer show even greater improvement.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. For instance, the invention is not limited just to fuel cells operating on pure hydrogen fuel but also to fuel cells operating on any hydrogen containing fuel or fuels containing hydrogen and different contaminants, such as reformate which contains CO and methanol. Such modifications are to be considered within the purview and scope of the claims appended hereto.

What is claimed is:

1. A solid polymer electrolyte fuel cell comprising a solid polymer electrolyte, a cathode, and anode components connected in series electrically wherein:
   i) the anode components comprise an anode, an anode gas diffusion layer, and a selectively conducting component, wherein the gas diffusion layer is separated from the anode electrode by the selectively conducting component;
   ii) the selectively conducting component comprises a mixed layer in direct contact with the side of the anode opposite the solid polymer electrolyte wherein the mixed layer comprises a mixture of a selectively conducting material and from about 6% to about 14% carbon by weight; and
   iii) the electrical resistance of the selectively conducting component in the presence of hydrogen is more than 100 times lower than the electrical resistance in the presence of air.

2. The fuel cell of claim 1 wherein the electrical resistance of the selectively conducting component in the presence of hydrogen is more than 1000 times lower than the electrical resistance in the presence of air.

3. The fuel cell of claim 1 wherein the selectively conducting material comprises a noble metal deposited on a metal oxide.

4. The fuel cell of claim 3 wherein the selectively conducting material comprises platinum deposited on tin oxide.

5. The fuel cell of claim 4 wherein the selectively conducting material comprises $SnO_2$.

6. The fuel cell of claim 1 wherein the carbon is a synthetic graphite.

7. The fuel cell of claim 1 wherein the thickness of the mixed layer is in the range from about 6 to about 12 micrometers.

8. The fuel cell of claim 1 wherein the selectively conducting component comprises a selectively conducting layer in direct contact with the side of the mixed layer opposite the solid polymer electrolyte wherein the selectively conducting layer consists essentially of the selectively conducting material and binder.

9. The fuel cell of claim 8 wherein the thickness of the mixed layer is in the range from about 2 to about 4 micrometers.

10. The fuel cell of claim 8 wherein the thickness of the selectively conducting layer is in the range from about 2 to about 8 micrometers.

11. The fuel cell of claim 1 wherein the selectively conducting material, carbon, and mixed layer characteristics are selected such that the fuel cell voltage is greater than about 0.5 V when operating at 1.5 A/cm$^2$.

12. A fuel cell stack comprising the fuel cell of claim 1.

13. A vehicle comprising a traction power supply comprising the fuel cell stack of claim 12.

14. A solid polymer electrolyte fuel cell comprising a solid polymer electrolyte, a cathode, and anode components connected in series electrically wherein:
   i) the anode components comprise an anode, an anode gas diffusion layer, and a mixed layer, wherein the gas diffusion layer is separated from the anode electrode by the mixed layer;
   ii) the mixed layer is in direct contact with the side of the anode opposite the solid polymer electrolyte and comprises a mixture of a selectively conducting material and from about 6% to about 14% carbon by weight; and
   iii) the electrical resistance of the mixed layer in the presence of hydrogen is more than 100 times lower than the electrical resistance in the presence of air.

15. A method for increasing the tolerance of a solid polymer electrolyte fuel cell to voltage reversal, the method comprising:
   adding a reversal tolerance imparting effective amount of carbon to a selectively conducting material to form a mixed layer forming material, and
   forming the solid polymer electrolyte fuel cell comprising
      a cathode flow field plate,
      a cathode gas diffusion layer,
      a cathode electrode,
      a solid polymer electrolyte,
      an anode electrode,
      a selectively conducting component having an electrical resistance more than 100 times lower in the presence of hydrogen than in the presence of air and comprising a mixed layer formed from said mixed layer forming material,
      an anode gas diffusion layer, and
      an anode flow field plate,
   wherein the mixed layer is in direct contact with the side of the anode electrode opposite the solid polymer electrolyte and separates the anode gas diffusion layer from the anode electrode, and
   wherein the reversal tolerance imparting effective amount of carbon is from about 6% to about 14% carbon by weight based on the weight of the mixed layer.

16. The method of claim 15 comprising incorporating a selectively conducting layer in direct contact with the side of the mixed layer opposite the solid polymer electrolyte wherein the selectively conducting layer consists essentially of the selectively conducting material and binder.

* * * * *